United States Patent [19]

Kurschner et al.

[11] Patent Number: 4,905,969

[45] **Date of Patent: * Mar. 6, 1990**

[54] ELECTRIC FENCE WIRE CONSTRUCTION

[75] Inventors: Felix Kurschner, Mississauga; Richard L. Goodings, Milton, both of Canada

[73] Assignee: Bay Mills Limited, Brampton, Canada

[ * ] Notice: The portion of the term of this patent subsequent to Mar. 1, 2005 has been disclaimed.

[21] Appl. No.: 105,973

[22] Filed: Oct. 6, 1987

Related U.S. Application Data

[63] Continuation of Ser. No. 684,118, Dec. 20, 1984, Pat. No. 4,728,080, which is a continuation-in-part of Ser. No. 531,720, Sep. 13, 1983, abandoned.

[51] Int. Cl.[4] .................................... A01K 3/00

[52] U.S. Cl. .................................... 256/10; 256/45; 174/126.2

[58] Field of Search .................... 256/10, 4, 6, 45, 46; 174/126.2, 128.1, 133 R

[56] References Cited

U.S. PATENT DOCUMENTS

| | | | |
|---|---|---|---|
| 1,405,534 | 2/1922 | Merritt . | |
| 2,359,090 | 9/1944 | Dyer . | |
| 3,029,589 | 4/1962 | Caroselli et al. . | |
| 3,067,569 | 12/1962 | Kelley . | |
| 3,264,404 | 8/1986 | Trebby et al. . | |
| 3,291,897 | 12/1966 | Bramley . | |
| 3,495,025 | 2/1970 | Ross . | |
| 3,642,516 | 2/1972 | Gasaway et al. . | |
| 3,644,866 | 2/1972 | Deardurff . | |
| 3,647,939 | 3/1972 | Schoerner . | |
| 3,909,508 | 9/1975 | Ross . | |
| 3,939,299 | 2/1976 | Raw et al. | 174/126.2 X |
| 3,980,277 | 9/1976 | Enoksson . | |
| 4,042,753 | 8/1977 | Smith | 174/126.2 X |
| 4,097,686 | 6/1978 | Gladenbeck . | |
| 4,154,430 | 5/1979 | Pfarr, Jr. | 256/45 X |
| 4,300,306 | 11/1981 | Hudgin . | |
| 4,458,107 | 7/1984 | Heroux . | |
| 4,463,323 | 7/1984 | Piper . | |
| 4,494,733 | 1/1985 | Olsson . | |
| 4,527,135 | 7/1985 | Piper . | |
| 4,676,485 | 6/1987 | Ciordinik et al. | 256/10 X |
| 4,728,080 | 3/1988 | Kurschner et al. | 256/10 |

FOREIGN PATENT DOCUMENTS

| | | | |
|---|---|---|---|
| 1176885 | 10/1984 | Canada | 256/10 |
| 2532908 | 2/1976 | Fed. Rep. of Germany . | |
| 2180504 | 11/1973 | France . | |
| 7710230 | 3/1979 | Netherlands | 256/10 |
| 89031 | 5/1960 | Sweden . | |

*Primary Examiner*—Randolph A. Reese

*Assistant Examiner*—Peter M. Cuomo

*Attorney, Agent, or Firm*—Fitzpatrick, Cella, Harper & Scinto

[57] ABSTRACT

An electric fence wire construction is made by plying or weaving coated supporting members, preferably fiberglass coated with polyvinyl chloride, with conducting members, preferably aluminum.

14 Claims, 2 Drawing Sheets

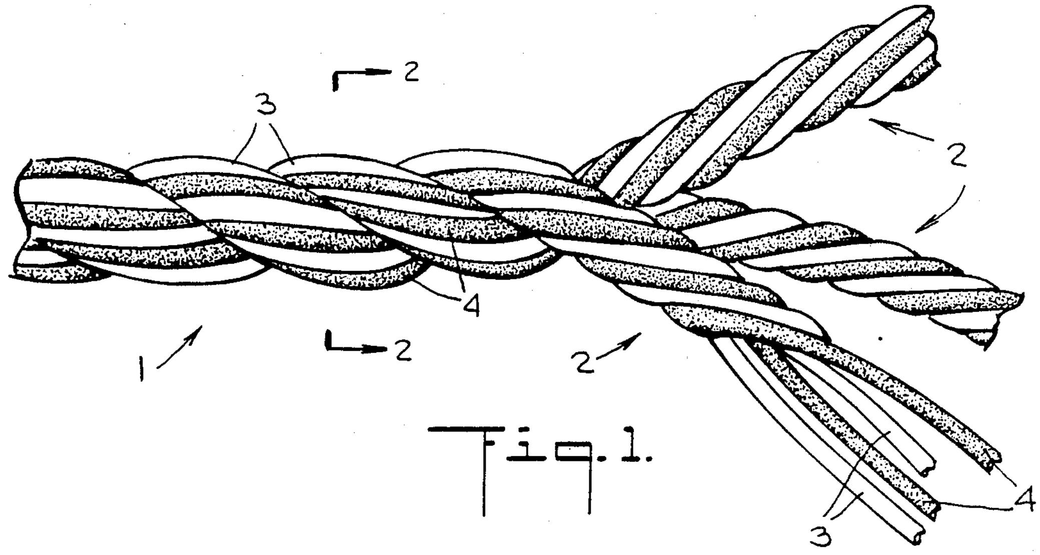
Fig. 1.
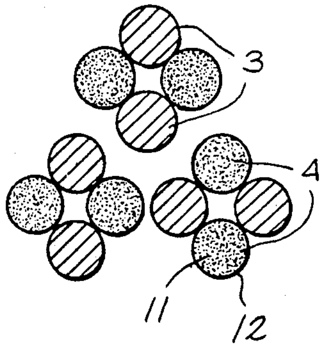
Fig. 2.
Fig. 3.
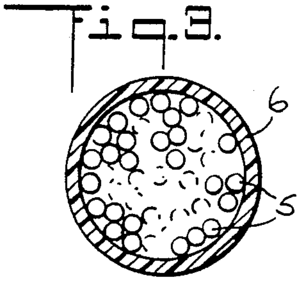
Fig. 4.
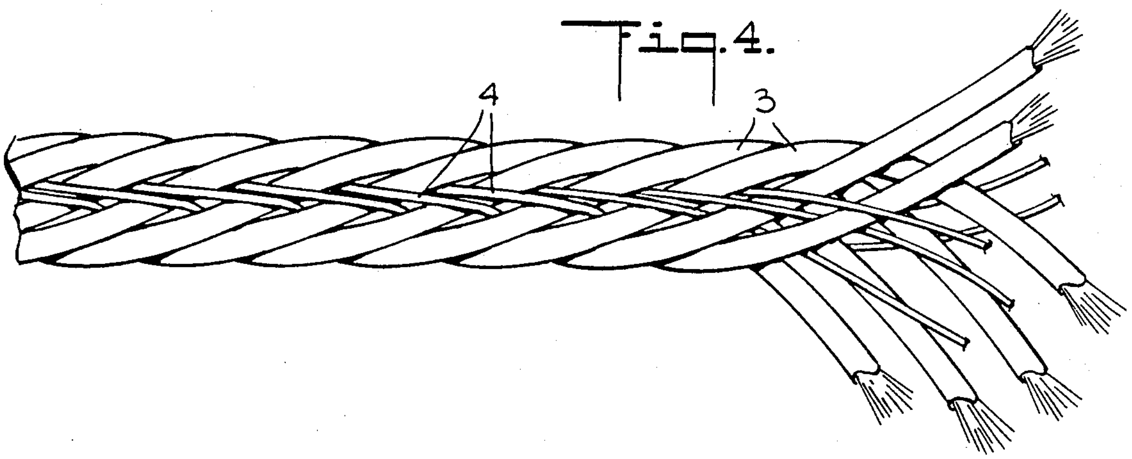

ELECTRIC FENCE WIRE CONSTRUCTION

This is a continuation of application Ser. No. 684,118, now U.S. Pat. No. 4,728,080, filed Dec. 20, 1984, which is a continuation-in-part of application Ser. No. 531,720, filed Sept. 13, 1983, now abandoned.

BACKGROUND OF THE INVENTION

1. Field of the Invention

This invention relates to an improved electric fence wire construction for use by cattlemen, farmers, and others. Electric fence wire constructions carry an electric charge which shocks animals upon contact with the outer surface of the construction and tends to prevent their crossing the fence. These constructions are strung from fence posts or other convenient attachment points. They may be used as perimeter fencing to enclose animals or to keep out predators. They may also be used to subdivide pastures temporarily to insure that they are grazed uniformly, in which case the electric fence wire construction may be taken down and restrung every few days forcing animals to graze different strips of land in regular rotation.

The electric fence wire construction of this invention comprises both support members and conductive members which should have several inter-related, special characteristics to perform well. The wire construction should be abrasion resistant, sufficiently light in weight to be portable, and flame resistant (that is to say, self-extinguishing or unable to support combustion). It should be reasonably flexible, yet strong, should knot without breaking, and should hold a knot without slipping. Because these wire constructions may be relocated several times, they should resist wear not only while in use, but also during handling when they are taken down and put up for relocation to another site. The conductive members should have a high degree of conductivity and be sufficiently malleable to perform satisfactorily in splicing. Furthermore, electric fence wire constructions should retain these properties when subjected to extremes of weather and temperature over long periods. For example, the wire construction should resist fading, corrosion, and loss of strength in blizzards at less than −50° F. (−46° C.) and direct sunlight at above 100° F. (38° C.), and have a low coefficient of linear expansion to resist contraction when cold and sagging when warm.

DESCRIPTION OF THE PRIOR ART

For several years the prior art has been typified by single component constructions of galvanized steel wire, which are sufficiently thick to serve both conducting and supporting functions simultaneously, and by a plied, rope-like combination electric fence wire construction in which an olefin fiber such as polyethylene or polypropylene fiber serves as the supporting member and stainless steel wire serves as the conducting member. U.S. Pat. No. 3,291,897 (Bramley) shows an example of this latter construction.

These prior art electric fence wire constructions suffer several drawbacks, which as far as we know the art has not solved in the seventeen years since the Bramley Patent issued. The single component steel wire constructions, while strong, are too heavy for easy portability and installation and hence are impractical in many situations. In the combinations of olefin supporting members with stainless steel, the stainless steel wire construction when spliced or knotted has heated sufficiently to cause fires. To compound this problem, flames have been carried along the length of the wire construction by prior art supporting members, spreading the fire to adjacent fields or buildings. These prior art supporting members have also been subject to loss of strength upon exposure to weather, particularly to the ultraviolet rays in sunlight. Furthermore, olefin fibers do not hold a knot well; the ability to hold a knot is important, for example, when splicing the beginning of one package of electric fence wire to the end of another or when repairing a break.

Composite electric fence wire constructions of the prior art have occasionally been made with tinned copper as the conductor, which eliminated problems of low conductivity but was too weak to withstand breakage during use, and particularly during winding and unwinding the wire construction during temporary installation. Hence, as far as we know tinned copper is used little if at all.

We have noticed an additional problem in prior art combination electric fence wire construction when made for example from stainless steel supported by a conventional olefin. When stretched during installation or use, the conducting member may break while the supporting member remains intact. It is then difficult to locate the particular section of the electric fence wire construction which needs replacing.

SUMMARY OF THE INVENTION

Our invention can solve or mitigate these problems and provides additional advantages. It makes possible the use of low-stretch, light-weight support members, conductors with superior conductivity, and provides electric fence wire constructions with superior flame resistance, superior strength, superior resistance to wear and weathering, and superior knotting characteristics. In particular, the use of low stretch supporting materials is effective in preventing fracture of the conductor significantly before breaking of the entire fence wire construction.

In one aspect the present invention comprises (a) an elongated support member which comprises a core material and a coating and (b) an elongated conductive member. The core material of the support member provides a significant amount of strength to the support member. By braiding or twisting and plying we assemble the coated support member and the conductive member with a substantial portion of the conductive member exposed to the outer surface of the construction. One or a number of supporting filaments or strands may be assembled with one or a number of filaments or strands of conductor to make the electric fence wire construction. We use "filament" to identify a single fiber; groups of filaments make up a "strand"; and one or more strands make up a "yarn".

A single coating may be applied around each strand of supporting material. Alternatively, strands may be coated or impregnated with a material of low viscosity such that each individual filament as well as the entire group is encapsulated, for example using a resinous solution or latex.

By selecting a coating material which is characterized by substantially greater abrasion resistance, or fracture resistance when knotted, than the core material, we have found that high-strength, low stretch core materials such as fiberglass, which would be expected to break when used in electric fence wire constructions, can in fact be adapted for such use and the cost of such coatings is more than offset by the resulting combination of strength, durability, flexibility and other improved properties which are obtained. For example, the application of such coatings gives abrasion resistance to each of the individual filaments and results in improved properties insofar as resistance to breakage due to knotting is concerned.

In addition, by selecting and applying a coating material which is resistant to weathering (for example, exposure to chemicals, moisture, and the effects of ultra-violet radiation), to a substantially greater degree than the core material, one is able to use core materials which would not otherwise be satisfactory in electric fence wire constructions. Moreover, not only are the properties obtained by using a coating material and a core material in the support member improved over the use of either material alone, but the improvements are sufficiently great to justify the added step of applying the materials.

The coating may be applied using any one of various methods, including extrusion and crosshead extrusion, or it may be applied as a liquid using polyvinyl chloride in the form of a plastisol, organosol, latex or other solution or dispersion, by dip-coating, curtain coating, or other method, metering off any excess if necessary, and then drying, fusing or curing, depending upon the requirements of the solution or dispersion. The resulting coated strand preferably has a total diameter of about 20 mils (500 microns).

Other possible coatings include plastics or rubbers such as polyurethanes, acrylics and polyesters chosen for their good weather resistance, flame retardance, ability to receive color and color fastness, ability to impart good knot holding characteristics (i.e., not slippery), or abrasion or fracture resistance. These coatings may be solid or plastic foams.

We prefer to combine filaments of a support material into strands and apply coating to the strands. We then prefer to ply one or several of these strands with strands or individual filaments of conductive material into yarns containing support material and conductive material, and to ply these yarns to make the final electric fence wire construction. Braiding may also be used to make these constructions and has the advantage of unraveling less than plied constructions.

The support member we prefer to use is fiberglass coated with a polyvinyl chloride which includes flame inhibitors of the kind known for use with polyvinyl chloride. We have found this composite is flame resistant, strong, low-stretch, and capable of holding a knot well. It also has reduced problems of abrasion and loss of strength in knotting due to stress fracture, which fiberglass alone would exhibit. Such composites have been proven in outdoor use as insect screens to have superior characteristics of resistance to weathering and fading, but we are aware of no previous use in electric fence wire construction or under the full range of conditions to which electric fence wire constructions are subject.

The conductive member we prefer to use is aluminum wire, and we find most preferable wire drawn from an alloy which has on its surface a metallurgically bonded aluminum alloy coating that is anodic to the core and thus electrolytcally protects the core against corrosion, such as known at present in the industry as Alclad 5056. Alclad 5056 has proven its corrosion resistance through use in braided cable armor wire, insect screen cloth, and chain link fence, but we are aware of no previous use in electric fence wire construction or under the full range of conditions to which electric fence wire constructions are subject.

BRIEF DESCRIPTION OF THE DRAWINGS

FIG. 1 is a side elevational view of a twisted and plied electric fence wire construction according to the present invention;

FIG. 2 is a cross-sectional view taken at line 2—2 of FIG. 1;

FIG. 3 is an enlarged cross-sectional view of one strand of a support member of FIG. 1;

FIG. 4 is a side elevational view of a braided electric fence wire construction according to the present invention.

DETAILED DESCRIPTION OF THE PREFERRED EMBODIMENTS

Figure 5:
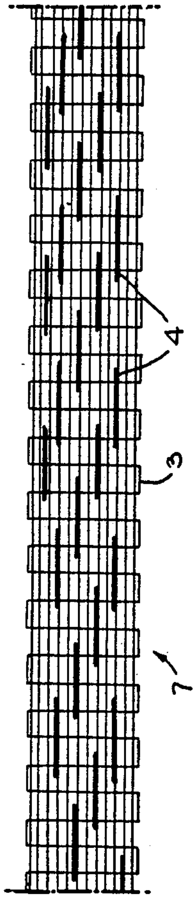
FIG. 5 is the top elevational view of one embodiment of a ribbon electric fence wire construction according to the present invention.
Figure 6:
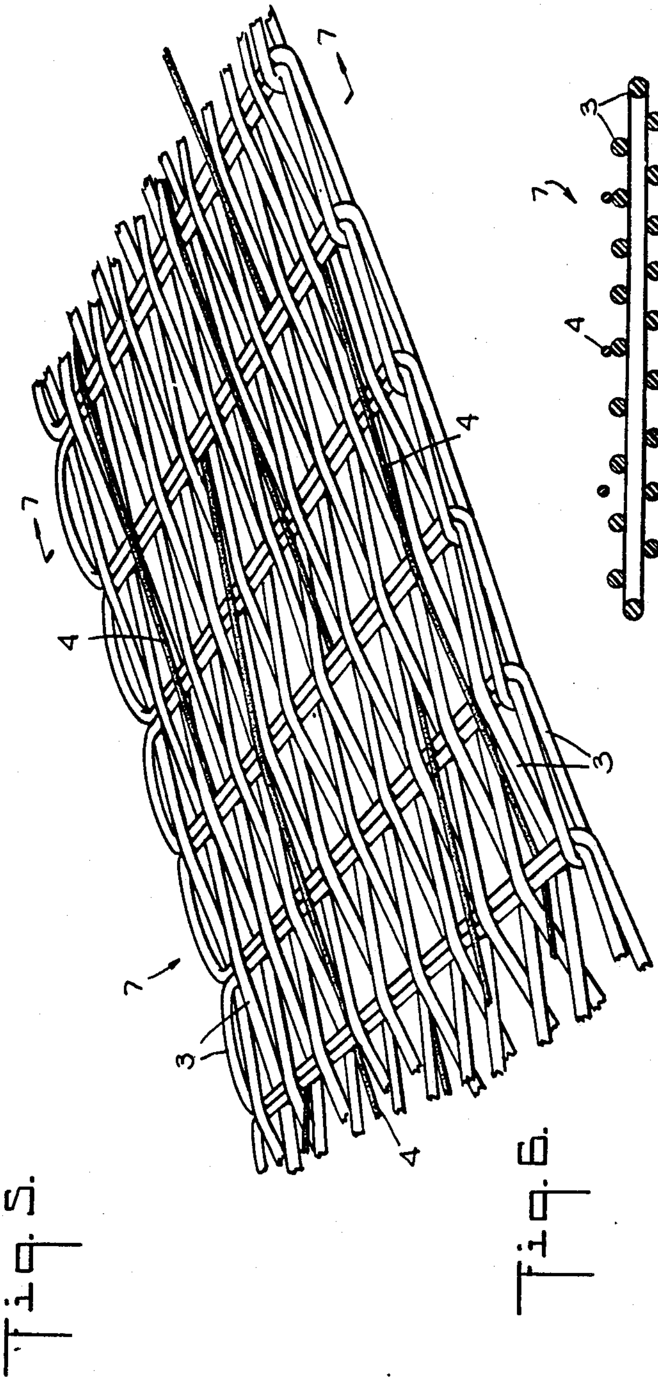
FIG. 6 is a three-quarter view taken at line 7—7 of FIG. 6.
Figure 7:
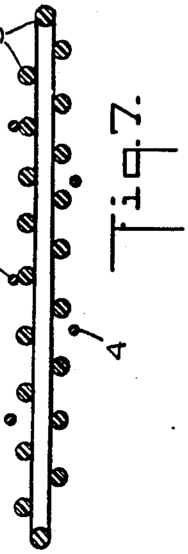
FIG. 7 is a cross-sectional view taken at line 7—7 of FIG. 6. These figures are not drawn to scale.

Referring to the FIGS. 1 to 3, an electric fence wire construction 1 comprises yarns 2 which are plied together. Each yarn 2 is made up of coated support members 3 and conductive members 4 which are twisted together. The support members comprise filaments 5, which may be fiberglass, and a coating 6, which may be polyvinyl chloride. In FIG. 4, the coated support members 3 and the conductive members 4 are braided together. FIGS. 5 to 7 shows one embodiment of a ribbon electric fence wire construction. The ribbon 7 is made up of coated support members 3 and conductive members 4 which are woven in a conventional ribbon construction.

As shown in these figures, the conductive members 3 are twisted, braided or woven with the plurality of support members 3 so that the conductive members 3 pass into and out of the electric fence wire construction.

We prefer to ply two strands of fiberglass supporting material coated with polyvinyl chloride and two filaments of aluminum conductor together at about 3½ turns per inch ("TPI") in the "Z" direction, and to ply three of these yarns together at 1½ TPI "S" twist to provide the finished product, which is therefore composed of six strands of a coated fiberglass and six filaments of aluminum conductor. The individual yarns in our invention may preferably be twisted from about one to about six turns per inch and the final yarns plied in a yarn from about one-half to six turns per inch. The electric fence wire construction of the present invention may be braided or twisted and plied on conventional machines such as those used for twine or rope.

The word "intermesh" is used herein to refer to the twisted and plied construction of FIG. 1, to the braided construction of FIG. 4, to the woven construction used in the ribbon of FIG. 5, to other constructions described herein and to equivalent constructions for making conductive members lay beside and be supported by support members in electric fence wire.

In ribbon embodiments we prefer to use support members comprising a fiberglass core coated with polyvinyl chloride, although other support member constructions may be used. We also prefer to use in ribbon embodiments a conductive member of aluminum, most preferably having a core 11 of aluminum and a cladding 12 of aluminum alloy such as Alclad 5056. The conductive member may be woven, including forms of interlacing, (i) lengthwise along the ribbon (that is, in the warp direction), (ii) across the ribbon, or (iii) in both directions. The conductive filaments may comprise from zero to all of the filaments or stands in either the lengthwise or crosswise direction. FIGS. 5 to 7 shown an embodiment in which about one conductive filament is used for every five to ten of other supporting lengthwise strands.

We prefer to use low-twist fiberglass strands known in the industry as 37 1/0. The designation 37 indicates that 3700 yards of the fiberglass weigh one pound. The 1/0 indicates that the number of twisted strands plied together is one and the number of single strands twisted in continuous filaments is zero. The individual filaments making up a single strand of 37 1/0 may number between 800 and 1600 and may be either G (9 micrometers diameter) or DE (6 micrometers diameter). The fiberglass we use is typically continuous filament made from electrical grade glass. Fiberglass weights may range from about 18 ⅓ (or 1500 tex) to about 150 1/0 (or 33 tex), where tex indicates the number of grams per thousand meters of the particular fiber.

Most fiberglass fibers in uncoated condition come with chemical sizes (surface finishes containing some chemical constituents other than water) applied by the manufacturer. These may be starch sizes or preferably lubricating hydrophobic sizes which keep water from the glass and lubricate the individual filaments to reduce abrasion.

Glass is also desirable for its low coefficient of linear expansion, for example, typically about $5\times10^{-6}$ centimeters per centimeter per degree centigrade. By way of comparison, steel has a factor of about $10\times10^{-6}$, aluminum a factor of about $20\times10^{-6}$, and polypropylene about $80\times10^{-6}$ centimeters per centimeter per degree centigrade.

Our most preferred support members have very low stretch, less than about four to five percent elongation of single filaments before breaking. Materials for such members include fiberglass. High modulus, high tenacity poly (p-phenylene terephthalamide) fiber such as Kevlar-type aramid fibers, and high tenacity rayon fibers may also be used. Supporting materials with up to about ten percent elongation of single filaments at break are also desirable, and supporting materials of up to about thirty percent elongation of single filaments at break may be used. Support member core fibers may include polyester, nylon, and other materials, particularly where their stretch properties are kept below thirty percent.

While materials such as the present Alclad 5056 aluminum is the most preferred conducting member, other aluminum alloys are preferred and other conductors may be used including stainless steel and tinned copper. Aluminum used in our invention is preferrably about 0.010 inches (0.0254 cm.) in diameter but may range in diameter from about 0.005 inches (0.0127 cm.) to about 0.020 inches (0.0508 cm.).

The construction of this invention has superior properties in that it resists weathering and has superior conductivity. By way of comparison, electric fence wire construction in the prior art using uncoated olefins lost its strength after two years of outdoor use, whereas fence wire construction of the present invention should not.

Electric fence wire construction of this invention is resistant to stretching, and particularly the supporting fibers are resistant to stretching, so that the conductor and the supporting fibers in our tests break at substantially the same time, which makes broken conductors easy to locate. The wire construction of this invention has also been found in our testing to knot well, and to resist stress fracture, abrasion, and flames. The conductor is sufficiently malleable to perform well in splicing.

In the prior art, stainless steel wire construction was typically plied as four strands polyethylene to one strand of stainless steel wire construction to make up a yarn. Three of these yarns were then plied together to make the final electric fence wire construction, which therefore contained a total of three ends of stainless steel conductor and twelve ends of supporting fiber of polyethylene or polypropylene. In some of this prior art, the stainless steel wire construction had been overfed to make it lie loosely in the polyethylene supporting fibers.

Preferred embodiments of the present invention have been described above in detail for purposes of illustration. Modifications may be made by those skilled in the art to the preferred embodiment of electric fence wire constructions described above in order to adapt them to particular applications.

We claim:

1. An improved electric fence wire construction for administering an electric shock to animals, said electric fence wire construction comprising:

an elongated support member and an elongated electric conductor for carrying electricity to administer the electric shock, a portion of said elongated electrical conductor passing into and out of the construction so that the support member supports the conductor with a substantial portion of the conductor being exposed, said conductor consisting essentially of aluminum or aluminum alloy wire.

2. The electric fence wire construction of claim 1 in which the conductor consists essentially of a high strength conductive central core region and a weather resistant conductive cladding.

3. The electric fence wire construction of claim 2 in which the core region is aluminum and the cladding is aluminum alloy.

4. The electric fence wire construction of claim 1, wherein the conductor comprises an aluminum alloy having sufficient durability to maintain its conductive properties and to resist breaking when exposed to adverse weather conditions.

5. The electric fence wire construction of claim 4, wherein said aluminum alloy conductor is from about 0.005 to about 0.020 inches is diameter.

6. The electric fence wire construction of claim 5, wherein said aluminum alloy conductor is about 0.010 inches in diameter.

7. The electric fence wire construction of claim 1, wherein the conductor comprises aluminum having sufficient durability to maintain its conductive properties and to resist breaking when exposed to adverse weather conditions.

8. An article useable in an electric fence for administering an electric shock to animals, said article comprising:

an elongated woven support member in the form of a ribbon having first and second sides; and an elongated electrical conductor consisting essentially of aluminum or aluminum alloy wire;

said conductor for carrying electricity to administer the electric shock, a portion of said elongated electrical conductor passing into and out of the construction with a substantial portion of the conductor being exposed.

9. An article according to claim 8, wherein said electrical conductor has sufficient durability to maintain its conductive properties and to resist breaking when exposed to adverse weather conditions.

10. An article according to claim 9, wherein said electrical conductor comprises an aluminum alloy.

11. An article according to claim 10, wherein said aluminum alloy electrical conductor is from about 0.005 to about 0.020 inches in diameter.

12. An article according to claim 11, wherein said aluminum alloy electrical conductor is about 0.010 inches in diameter.

13. An article according to claim 9, wherein said electrical conductor comprises aluminum.

14. An article according to claim 8, wherein said supporting member comprises a core material lending substantial strength to said supporting member, and a coating material coating the core material.

* * * * *